United States Patent
Ueda et al.

(10) Patent No.: US 8,042,458 B2
(45) Date of Patent: Oct. 25, 2011

(54) HEATING COOKER AND TRAY THEREFOR

(75) Inventors: Shinya Ueda, Yamatotakada (JP);
Kiyoshi Yamaguchi, Yamatokooriyama (JP); Kazuyuki Matsubayashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 883 days.

(21) Appl. No.: 11/996,740

(22) PCT Filed: Jul. 24, 2006

(86) PCT No.: PCT/JP2006/314590
§ 371 (c)(1),
(2), (4) Date: Jan. 24, 2008

(87) PCT Pub. No.: WO2007/013408
PCT Pub. Date: Feb. 1, 2007

(65) Prior Publication Data
US 2010/0126358 A1    May 27, 2010

(30) Foreign Application Priority Data

Jul. 25, 2005   (JP) ................................ 2005-214602
Aug. 5, 2005   (JP) ................................ 2005-227612

(51) Int. Cl.
*A21B 1/22*   (2006.01)
*F24C 1/00*   (2006.01)
*H05B 3/00*   (2006.01)

(52) U.S. Cl. ............ 99/476; 99/474; 219/400; 219/401; 126/21 A (58) Field of Classification Search .................... 99/476, 99/474, 475; 219/400, 401; 126/21 A
See application file for complete search history.

(56) References Cited

U.S. PATENT DOCUMENTS

| 4,481,396 A * | 11/1984 | Matsubayashi et al. ...... 219/681 |
| RE31,765 E * | 12/1984 | Guibert ......................... 219/400 |
| 6,040,564 A | 3/2000 | Ueda et al. |
| 7,491,914 B2 * | 2/2009 | Kim et al. ..................... 219/400 |
| 2005/0217503 A1 * | 10/2005 | McFadden ....................... 99/476 |
| 2008/0223352 A1 | 9/2008 | Ando et al. |

FOREIGN PATENT DOCUMENTS

| JP | 54-10460 A | 1/1979 |
| JP | 55-172707 | 12/1980 |
| JP | 2-306030 A | 12/1990 |
| JP | 9-101034 A | 4/1997 |
| JP | 2000-130770 A | 5/2000 |

(Continued)

*Primary Examiner* — Reginald L Alexander
(74) *Attorney, Agent, or Firm* — Birch, Stewart, Kolasch & Birch, LLP (57) ABSTRACT

A heating cooker has a side wall of a heating chamber (20) formed with an outlet (22) for discharging a heating fluid and an engagement portion (3a). A tray (4) has an edge portion (4a), a side wall portion (4b) having a thorough hole (4f), a flat surface portion (4c), an inner wall portion (4d), and a bottom portion (4e). When the tray is engaged with the engagement portion with its front surface side facing up, the through hole faces the outlet. A part of the discharged heating fluid is fed to the rear surface side of the tray through the through hole, and the remaining fluid is fed to the front surface side. When the tray is engaged with the engagement portion with its rear surface side facing up, an opening in a groove portion (4i) defined between the side wall portion and the inner wall portion faces upward.

9 Claims, 9 Drawing Sheets

FOREIGN PATENT DOCUMENTS

| | | |
|---|---|---|
| JP | 2003-217823 A | 7/2003 |
| JP | 2003-302051 A | 10/2003 |
| JP | 2004-235162 A | 8/2004 |
| JP | 2004-294050 A | 10/2004 |
| JP | 2005-061761 A | 3/2005 |
| JP | 2005-069521 A | 3/2005 |
| JP | 2005-155962 A | 6/2005 |
| JP | 2005-195247 | 7/2005 |

* cited by examiner

HEATING COOKER AND TRAY THEREFOR

BACKGROUND OF THE INVENTION

1. Field of the Invention

The present invention relates to a heating cooker which heats an object to be cooked with heating fluid, and a heating cooker tray which is placed in a heating chamber of the heating cooker to support the object to be cooked.

2. Description of the Related Art

One of the conventional heating cookers which heat objects to be cooked includes an upper heater provided on the ceiling of a heating chamber and a lower heater provided on the rear side of a bottom plate of the heating chamber, in which a food product is placed on a turntable provided on the bottom plate in the heating chamber so as to be cooked with the upper and lower heaters (see, e.g., JP H2-306030 A).

However in the conventional heating cooker, the lower heater is blocked from the food product by the turntable and bottom plate, so that heat is not conducted smoothly from the lower heater to the food product, thereby causing a problem of uneven heating of the food product between the upper side and the lower side.

As a solution to such a problem, there is conventionally a heating cooker for heating food products with steam, in which two steam outlets are respectively placed on each of the upper and lower sides of two side walls, which are opposite to each other in the heating chamber (see, e.g., JP 2003-302051 A). In this heating cooker, tall grill netting is placed on a turntable provided on the bottom plate in the heating chamber, and a food product is placed on this grill netting so that the food product is located between the upper outlet and the lower outlet in the vertical direction. The heating cooker aims at implementing even heating of the upper and the lower sides of the food product by sending steam to the upper side and the lower side of the food product from the upper outlet and the lower outlet. Moreover, when an object to be cooked is meat, the object to be cooked is placed on the grill netting so that meat juices and oil which ooze with heating are made to drop on the turntable to prevent the meat from being soaked with meat juices and oil.

However, the conventional heating cooker needs grill netting to ensure even heating from both upper and lower sides even in the case of cooking the objects to be cooked which are free from oozing of juices such as cookies and pizza. More specifically, the grill netting is placed on the turntable, onto which a square plate or the like is placed so that the objects to be cooked, such as cookies and pizza, are put in the square plate for cooking. Thus, there are many instruments to use, which causes a problem of too much time and effort in cooking. Moreover, the heating chamber needs to house grill netting and a square plate in addition to the turntable, which causes a problem of upsizing of the heating chamber. Further, it is necessary to clean the grill netting after cooking, which causes a problem of too much time and effort in maintenance. Moreover, when an object to be cooked is cooked through heating from only the upper side, the object to be cooked is directly placed on the turntable, so that grill netting becomes unnecessary and will be placed out of the heating cooker. Therefore, it becomes necessary to secure a space to place the grill netting out of the heating cooker, thereby causing a problem in which the grill netting placed out of the heating cooker becomes obstructive and gives an untidy impression.

SUMMARY OF THE INVENTION

Accordingly, an object of the present invention is to provide a heating cooker which is capable of reducing the number of implements to use depending on the content of cooking, reducing the time and effort of cooking, preventing upsizing, and preventing uneven heating, and also to provide a heating cooker tray which makes it possible to evenly heat both upper and lower sides of an object to be cooked with less time and effort without using auxiliary tools such as grill netting.

In order to solve the problem, a heating cooker according to a first aspect of the present invention comprises:

a heating fluid generating section for generating a heating fluid;

a heating chamber for heating an object to be cooked with the heating fluid supplied from the heating fluid generating section, said heating chamber having a ceiling and two side walls opposite to each other;

an outlet provided on at least one of the two side walls of the heating chamber for ejecting the heating fluid supplied from the heating fluid generating section into the heating chamber;

engaging portions provided on each of the side walls of the heating chamber; and a tray engageable with the engaging portions and comprising a bottom portion having a front surface and a rear surface so that an object to be cooked is placed on either one of the front surface and the rear surface, a groove portion formed along an edge of the bottom portion, a side wall portion continuous from the groove portion, and a through hole formed in the side wall portion, wherein the tray is configured such that:

when the tray is engaged with the engaging portions with the front surface of the bottom portion facing the ceiling side of the heating chamber, the through hole of the side wall portion is opposed to the outlet so that a part of heating fluid from the outlet is passed to either one of the front surface side or the rear surface side of the bottom portion, whereas when the tray is engaged with the engaging portions with the rear surface of the bottom portion facing the ceiling side of the heating chamber, an opening of the groove portion faces the ceiling side of the heating chamber.

With the above arrangement, when the tray is engaged with the engaging portions, with the front surface of the bottom portion facing the ceiling side of the heating chamber, the through hole of the side wall portion of the tray is opposed to the outlet. A part of heating fluid supplied from the heating fluid generating section and ejected from the outlet is passed to the front surface side or the rear surface side of the bottom portion via the through hole of the tray according to a position (i.e., a position of the engaging portions) of the tray with respect to the outlet. For example, when the outlet is positioned on the front surface side of the tray, a part of the heating fluid from the outlet is supplied to the rear surface side of the tray via the through hole, while the other part of the heating fluid from the outlet is supplied to the front surface side of the tray without being passed through the through hole. Moreover, when the outlet is positioned on the rear surface side of the tray, a part of the heating fluid from the outlet is supplied to the front surface side of the tray via the through hole, while the other part of the heating fluid from the outlet is supplied to the rear surface side of the tray without being passed through the through hole. Thus, heating fluid can be supplied to the front surface side and the rear surface side of the tray. By placing an object to be cooked on the front surface of the bottom portion of the tray, the object to be cooked is evenly heated between the upper side and the lower side with the heating fluid supplied to the front surface side and the rear surface side of the tray. When the objects to be cooked are cookies and pizza, both the upper and lower sides can be heated evenly without using conventional grill netting.

When the tray is engaged with the engaging portions of the heating chamber with the rear surface of the bottom portion facing the ceiling side of the heating chamber, the opening of the groove portion faces the ceiling side of the heating chamber. By placing an object to be cooked on the rear surface of the bottom portion of the tray, the object to be cooked is heated with the heating fluid supplied from the heating fluid generating section and ejected from the outlet. When the object to be cooked is meat for example, meat juices and oil oozing out with heating are collected in the groove portion. This makes it possible to prevent the meat from soaking with meat juices and oil. It is to be noted that an object to be cooked may be separated from the rear surface of the bottom portion by using, for example, grill netting, and the heating fluid may also be passed to the lower side of the object to be cooked so that both the upper and lower sides of the object to be cooked may evenly be heated.

Thus, when the front surface of the bottom portion of the tray faces the ceiling side of the heating chamber, an object to be cooked can be heated in the state where both the upper and lower sides are evenly heated, whereas when the rear surface of the bottom portion of the tray faces the ceiling side of the heating chamber, the juice of an object to be cooked oozing with heating can be collected in the groove portion. Therefore, by placing an object to be cooked on either the front or back surface of the tray depending on the type of the object to be cooked, the number of the implements to use for cooking can be reduced in comparison with the number in conventional examples, which in turn makes it possible to reduce the time and effort in cooking. Since the number of the implements to use in the heating chamber can be reduced, downsizing of the heating chamber can be achieved.

In one embodiment, the heating fluid generating section has a steam mode for generating superheated steam as the heating fluid and a hot air mode for generating a high temperature air as the heating fluid.

According to the above embodiment, it becomes possible to properly use the heating fluid which heats an object to be cooked depending on, for example, the type of the object to be cooked. The modes of the heating fluid generating section may be switched according to which surface faces the ceiling side of the heating chamber, the front surface or the rear surface of the bottom portion. Consequently, it becomes possible to achieve heating suitable for an object to be cooked with a small number of implements to use.

In one embodiment, the heating cooker is configured such that when the tray is engaged with the engaging portions with the rear surface of the bottom portion facing the ceiling side of the heating chamber, the through hole of the tray is located closer to the ceiling side than the rear surface of the bottom portion in a thickness direction of the bottom portion of the tray.

According to the above embodiment, when an object to be cooked, which is meat for example, is placed on the rear surface of the bottom portion of the tray for heating, meat juices and oil oozing out with heating are collected in the groove portion. In this regard, since the through hole is formed so as to be positioned closer to the ceiling side rather than to the rear surface of the bottom portion in the thickness direction of the bottom portion of the tray, the meat juices and oil collected in the groove portion are prevented from leaking out of the through hole. This prevents the bottom face of the heating chamber from being contaminated with meat juices and oil.

The present invention provides, according to its second aspect, a heating cooker tray for supporting an object to be cooked in a heating cooker wherein the heating cooker includes a heating chamber for heating an object to be cooked with a heating fluid, said heating chamber having a ceiling and two side walls opposite to each other, and an outlet provided on at least one of the two side walls of the heating chamber for ejecting a heating fluid into the heating chamber, the heating cooker tray comprising:

a generally rectangular-shaped bottom portion having a front surface and a rear surface such that the object to be cooked is placed on either the front surface or the rear surface;

a side wall portion which is continuous from at least one of two sides of the bottom portion that face each other, and which faces the outlet side when the tray is placed in a prescribed position in the heating chamber; and a first through hole which is formed in the side wall portion and which passes a part of the heating fluid supplied through the outlet into the heating chamber to one of a front surface side and a rear surface side of the bottom portion when the tray is placed in the prescribed position in the heating chamber.

With the above arrangement, the heating cooker tray is engaged in the heating chamber of the heating cooker, and an object to be cooked is laid on the front surface of the bottom portion. When heating fluid is supplied from the outlet formed on the side wall of the heating chamber, a part of the heating fluid flows through the first through hole formed on the side wall portion which faces the outlet side and passes to either one of the front surface side and the rear surface side of the bottom portion according to the position of the tray with respect to the outlet. The other part of the heating fluid flows to the other side out of the front surface side and the rear surface side of the bottom portion, the side where the outlet is formed, without flowing through the first through hole. The heating fluid which flowed into the front surface side of the bottom portion heats the upper side of the object to be cooked laid on the bottom portion. The heating fluid which flowed into the rear surface side of the bottom portion heats the lower side of the object to be cooked. Thus, without using the conventional high grill netting, heating fluid can be supplied to both the front and rear surfaces of the bottom portion on which an object to be cooked is laid, thereby ensuring even heating of both the upper and lower sides of the object to be cooked. This makes it possible to save the time and effort for placing the grill netting before cooking as well as the time and effort for cleaning the grill netting after cooking. Moreover, it is not necessity to secure the space for placing the non-use grill netting in the vicinity of the heating cooker, and this prevents the non-use grill netting from making the area around the heating cooker untidy. It is to be noted that in the case of heating an object to be cooked only from the upper side, the heating cooker tray may be placed on the bottom face of the heating chamber, and the object to be cooked may be placed on the heating cooker tray.

Moreover, since using the heating cooker tray having the first through hole allows the heating fluid from one outlet to be passed to both the upper and lower sides of the tray, at least one outlet has only to be provided, which makes it possible to simplify the structure of the heating cooker.

It is to be noted that the heating fluid refers to not only gas and fluid, but also vapor-liquid mixture fluid like steam. In short, the heating fluid can be any fluid which can heat objects to be cooked and has fluidity.

In one embodiment, the heating cooker tray further comprises a second through hole which is provided in a vicinity of at least one of two sides of the bottom portion which extend generally perpendicular to said side that is continuous from the side wall portion, and which through hole passes the heating fluid, which has been passed to the one of the front surface side and the rear surface side of the bottom portion via the first through hole, to the other one of the front surface side and the rear surface side of the bottom portion.

According to the embodiment, the heating fluid on either one of the front surface side and the rear surface side of the bottom portion of the heating cooker tray passes through the second through hole and flows into the other side out of the front surface side and the rear surface side of the bottom portion. Therefore, the heating fluid is efficiently circulated between the upper side and the lower side of the heating cooker tray to attain uniform temperature, which makes it possible to effectively prevent uneven heating between the upper side and the lower side of the object to be cooked placed on the heating cooker tray.

When a suction opening for the heating fluid is formed on the side in which the outlet is formed, the heating fluid on one of the front surface side and the rear surface side of the bottom portion is allowed to be returned to the other side out of the front surface side and the rear surface side of the bottom portion and discharged from the suction opening.

DETAILED DESCRIPTION OF THE INVENTION

Herein below, the present invention will be described in details in conjunction with the embodiments with reference to the drawings.

Figure 1:
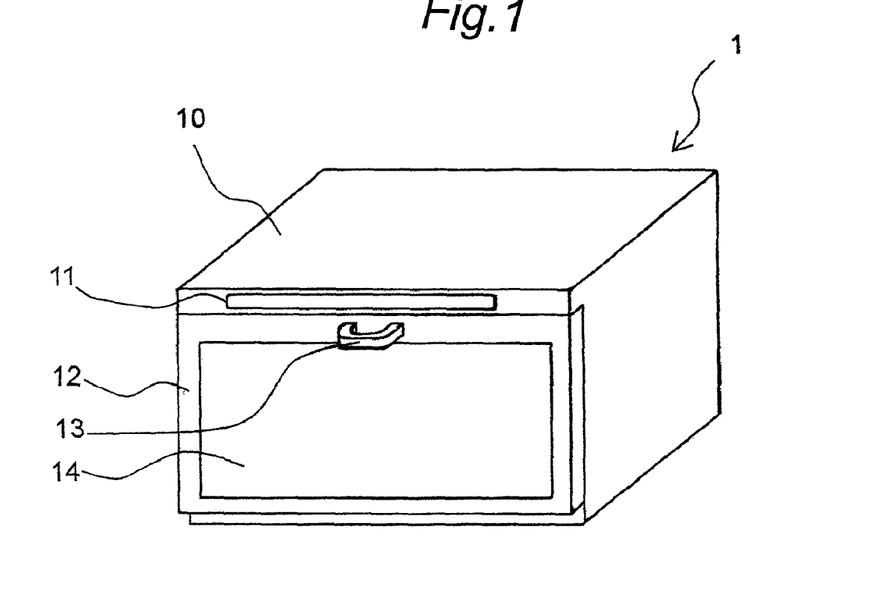
FIG. 1 is a perspective view showing an external appearance of a heating cooker in one embodiment.

FIG. 1 is a perspective view showing an external appearance of a heating cooker in the present embodiment. The heating cooker 1 is structured such that an operation panel 11 is provided on the upper side of the front surface of a cabinet 10 with a rectangular parallelepiped shape and a door 12 rotating around a lower end side is provided on the lower side of the operation panel 11 on the front surface of the cabinet 10. A handle 13 is provided on the upper side of the door 12 and a window 14 made of heat-resistant glass is fitted into the door 12.

Figure 2:
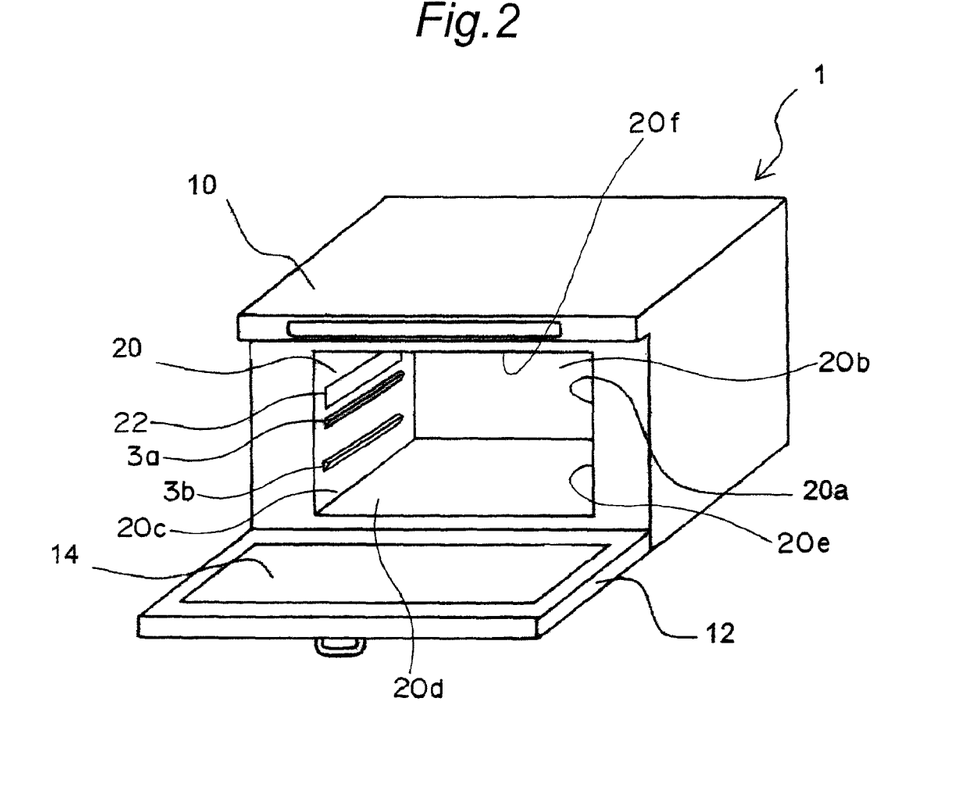
FIG. 2 is a perspective view showing an external appearance of the heating cooker with a door opened.

FIG. 2 is a perspective view showing an external appearance of the heating cooker 1 in the state where the door 12 is opened. In the cabinet 10, a heating chamber 20 with a rectangular parallelepiped shape is provided. The heating chamber 20 includes an opening 20a to be opened and closed by the door 12, a back side wall 20b which faces to the opening 20a, a left side wall 20c and a right side wall 20e which continue to both left and right sides of the back side wall 20b and which are opposed to each other, a ceiling 20f extending between the upper edge of the left side wall 20c and the upper edge of the right side wall 20e, and a bottom face 20d extending between the lower edge of the left side wall 20c and the lower edge of the right side wall 20e. The back side wall 20b, the left and right side walls 20c and 20e, the bottom face 20d, and the ceiling 20f of the heating chamber 20 are formed from stainless steel plates. As for the door 12 which opens and closes the opening 20a, the side facing the heating chamber is formed from a stainless steel plate. Thermal insulating materials (not shown) are mounted on the periphery of the heating chamber 20 and the inside of the door 12, so that the exterior and the interior of the heating chamber 20 are insulated.

An approximately rectangular, oblong outlet 22 extending generally horizontally is provided at a roughly central portion in a vertical direction on each of the left side wall 20c and the right side wall 20e of the heating chamber 20 (only one outlet is shown in FIG. 2). Upper engagement portions 3a extending approximately parallel to the outlets 22 are provided on the left side wall 20c and the right side wall 20e in the lower vicinity of the outlets 22. Lower engagement portions 3b are also provided below the corresponding upper engagement portions 3a. The upper and lower engagement portions 3a, 3b are provided in the state of protruding inward from both the left and right side walls of the heating chamber 20, and they have an upper end face extending generally in the horizontal direction from the respective left and right side walls and an inclined face which inclines and extends from the top of the upper end face toward the respective left and right side walls (see FIGS. 4A and 4B). A later-described edge portion 4a of the tray comes into contact with the upper end faces of the upper or the lower engagement portions 3a, 3b, by which the tray 4 is engaged with the upper or the lower engagement portions 3a, 3b.

Figure 3A:
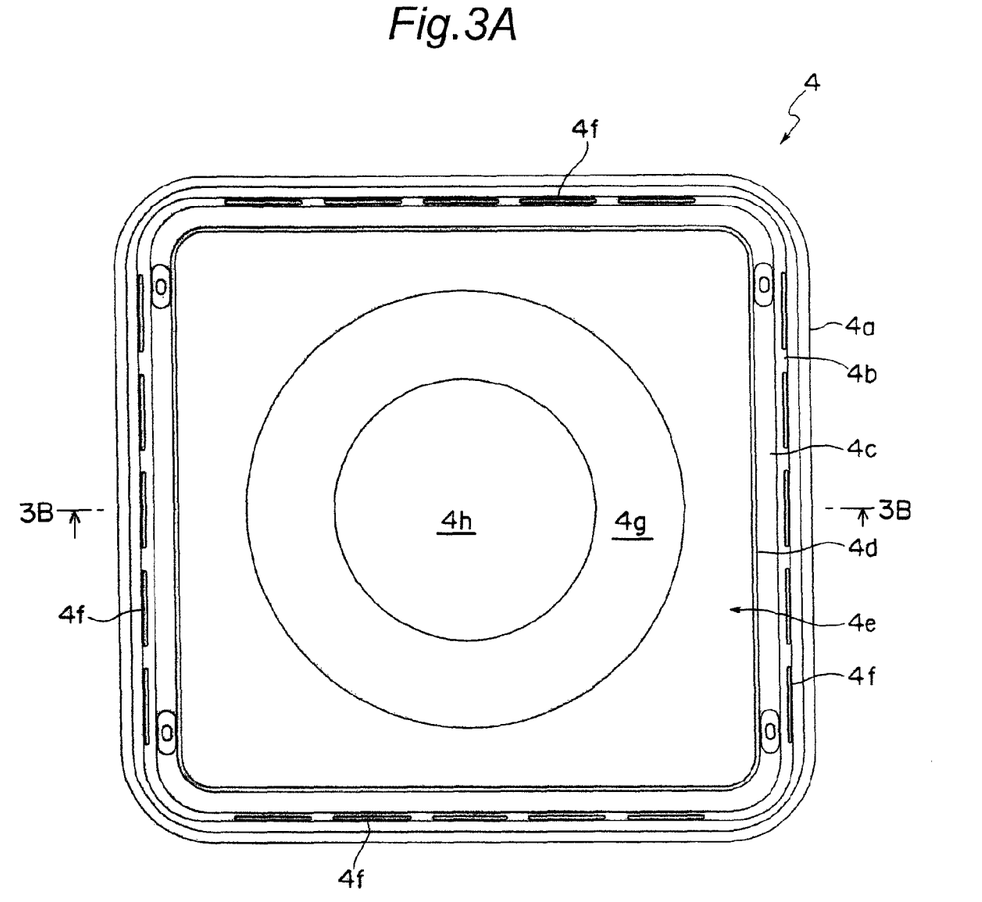
FIG. 3A is a plan view of a tray.
Figure 3B:
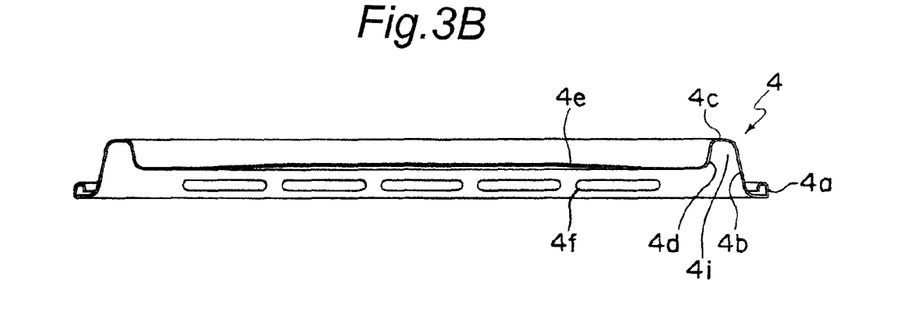
FIG. 3B is a cross sectional view taken along line 3B-3B of FIG. 3A.

FIGS. 3A and 3B are views showing the tray 4 engaged with the engaging portions 3a. More specifically, FIG. 3A is a plan view showing the tray 4, and FIG. 3B is a cross sectional view of the tray 4 taken along line 3B-3B of FIG. 3A. Hereinafter, the upper side of the tray as viewed in FIG. 3B is referred to as a front surface side of the tray 4, and the lower side of the tray is referred to as a rear surface side of the tray 4.

The tray 4 has a generally rectangular shape when two-dimensionally viewed, with its outline dimensions somewhat smaller than the inside dimensions of the heating chamber 20, and has roundish corner portions. The tray 4 includes, in order from the periphery to the inner side, a curled edge portion 4a, a side wall portion 4b which inclines toward the inner side and the front surface side (upper side in FIG. 3B), a flat surface portion 4c continuing to the upper end of the side wall portion 4b, an inner wall portion 4d which inclines from the flat surface portion 4c toward the inner side and the rear surface side (lower side in FIG. 3B), and a bottom portion 4e extending between the edge portion 4a and the flat surface portion 4c in the front and back surface direction (vertical direction in FIG. 3B). Elongated through holes 4f are formed near the four sides of the tray 4, extending parallel to each side. More specifically, the through holes 4f extending parallel to the longitudinal direction of the side wall portion 4b are formed in the vicinity of the lower end of the side wall portion 4b as viewed in the cross sectional view of FIG. 3B (in the vicinity of the periphery of the side wall portion 4b in the plan view of FIG. 3A). Four through holes 4f are provided for every side. The bottom portion 4e has an annular inclined face 4g which slightly inclines to the front surface side toward the inside and a circular flat face 4h positioned inside the inclined face 4g.

In the tray 4, a section of the side wall portion 4b closer to the front surface side from the bottom portion 4e, the flat surface portion 4c and the inner wall portion 4d form a groove portion 4i. When the tray 4 is placed in the heating chamber 20 with the rear surface side facing the ceiling side of the heating chamber 20, an opening of the groove portion 4i is to face the ceiling side of the heating chamber 20.

In the tray 4, an object to be cooked can be laid on both the front surface side and the rear surface side of the bottom portion 4e, and the tray 4 is engaged with either the upper engagement portion 3a or the lower engagement portion 3b of the heating chamber 20 depending on the size of the object to be cooked.

Figure 4A:
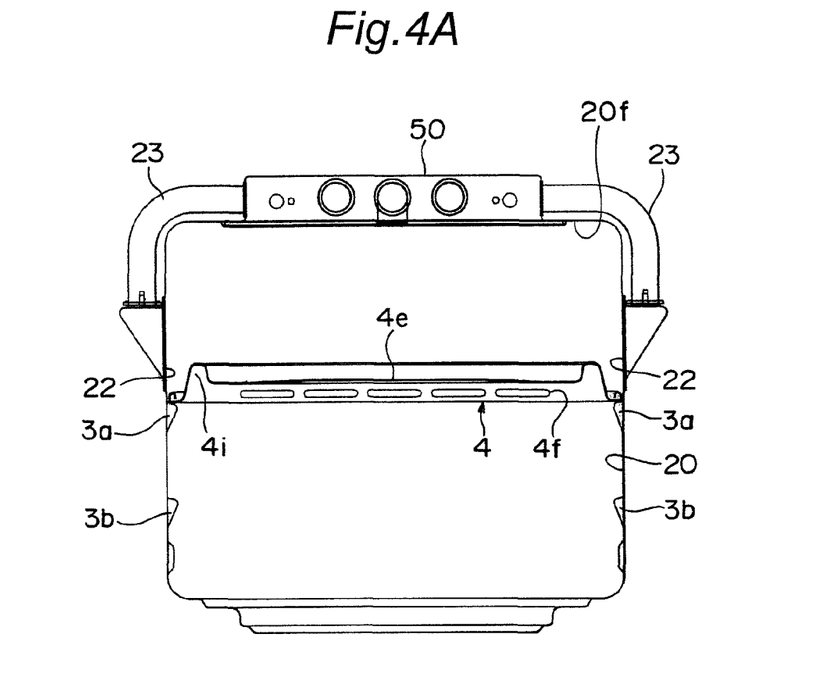
FIG. 4A is a view showing the tray engaged with upper engagement portions of a heating chamber with the front surface of the tray facing the ceiling side of the heating chamber.
Figure 4B:
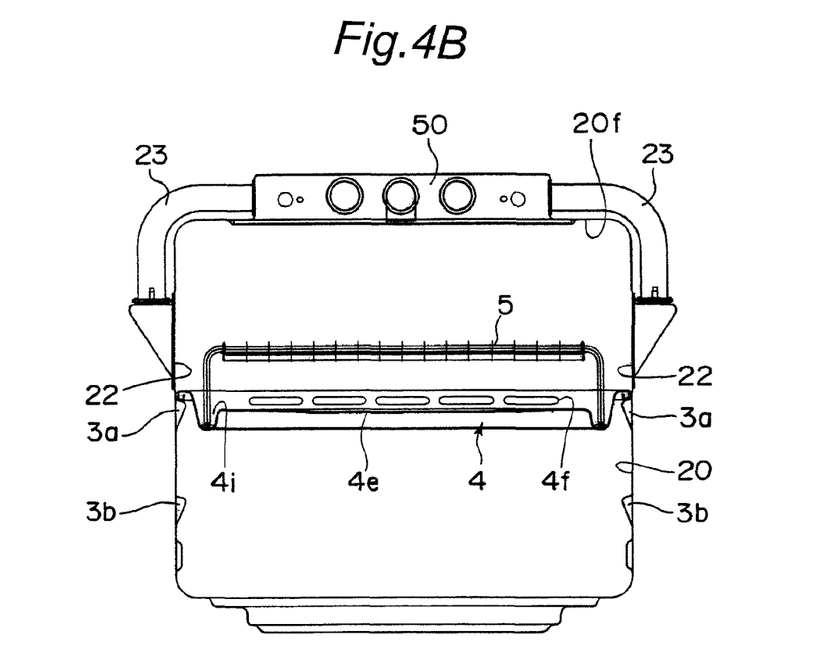
FIG. 4B is a view showing the tray engaged with the upper engagement portions of the heating chamber with the rear surface of the tray facing the ceiling side of the heating chamber.

FIGS. 4A and 4B are views showing the tray 4 engaged with the upper engagement portion 3a of the heating chamber 20. More specifically, FIG. 4A shows the tray 4 engaged in the heating chamber 20 with the front surface side facing the ceiling side of the heating chamber 20, while FIG. 4B shows the tray 4 engaged in the heating chamber 20 with the rear surface side facing the ceiling side of the heating chamber 20.

Figure 5:
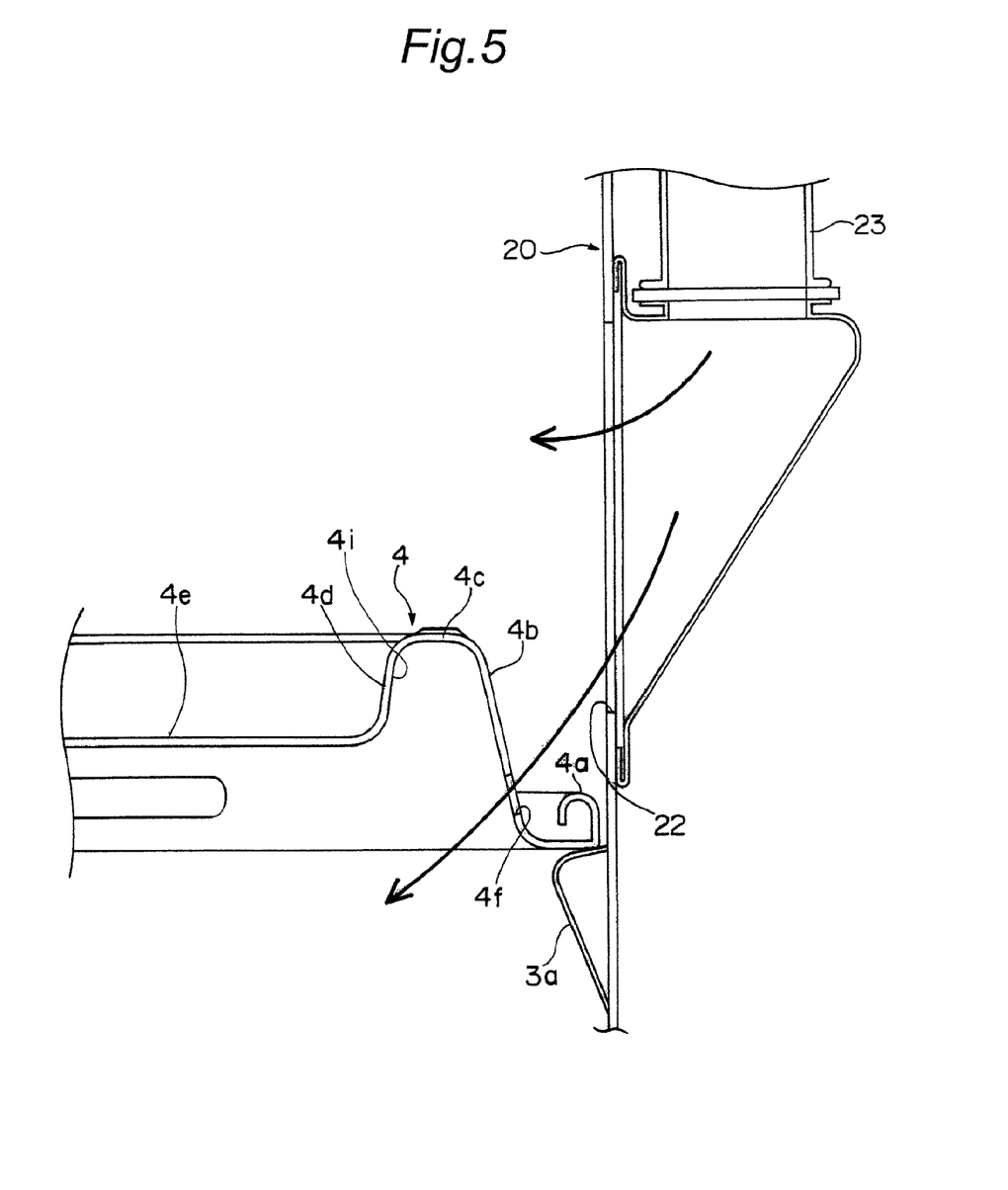
FIG. 5 is an enlarged cross sectional view showing a portion of the tray which is engaged with an engaging portion.

In the case where the tray 4 is engaged, with the front surface side facing the ceiling 20f side of the heating chamber 20, as shown in FIG. 4A, the through holes 4f formed on the side wall portion 4b of the tray 4 are opposed to the vicinity of the lower end of the outlet 22 as shown in FIG. 5. A part of steam and hot air ejected from the outlet 22 circulates to the rear side of the tray 4 via the through holes (first through holes) 4f which face the outlet 22. Typically, when the tray 4 is placed with the front surface side facing the ceiling side of the heating chamber 20, an object to be cooked is directly laid on the tray 4, so that the object to be cooked is heated by the hot air ejected from the outlet 22.

When the tray 4 is engaged, with the rear surface side facing the ceiling 20f side of the heating chamber 20, as shown in FIG. 4B, the through holes 4f in the side wall portion of the tray are distanced from the outlet 22. Therefore, the amount of steam and hot air flowing from the outlet 22 to the lower side of the tray 4 becomes smaller than that in the case where the tray 4 is placed with the front surface side facing the ceiling side. When the tray is placed with the rear surface side facing the ceiling side, if necessary, grill netting 5 is so placed that its leg portions are positioned in the groove portion 4i of the tray which faces the ceiling side, and then an object to be cooked is placed on the grill netting 5, so that steam and hot air are supplied to both the upper and lower sides of the object to be cooked. Typically, steam is supplied from the outlet 22 to heat the object to be cooked on the grill netting 5, while at the same time the juice and condensed water oozing from the object to be cooked are collected in the groove portion 4i of the tray.

Figure 6A:
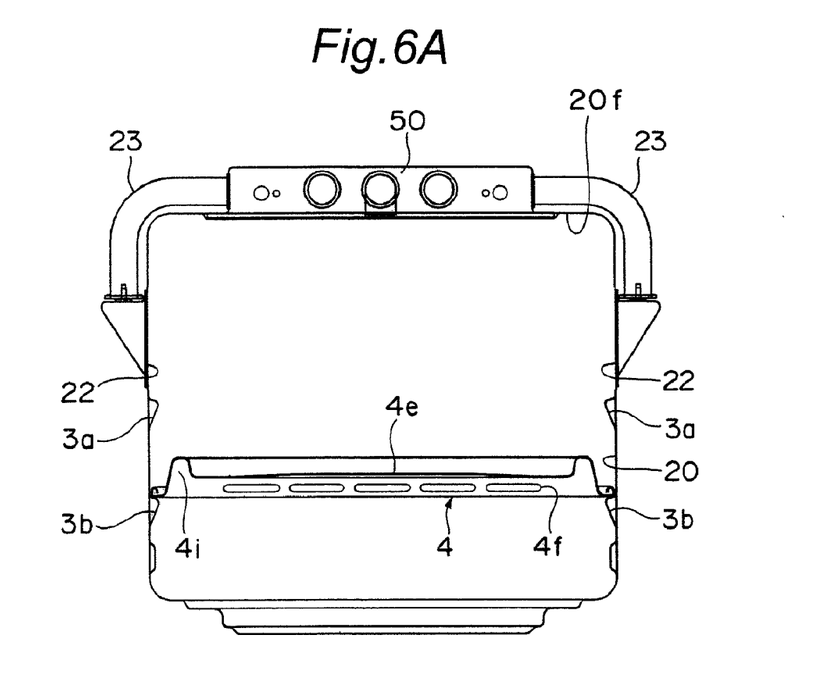
FIG. 6A is a view showing the tray engaged with lower engagement portions of the heating chamber with the front surface of the tray facing the ceiling side of the heating chamber.
Figure 6B:
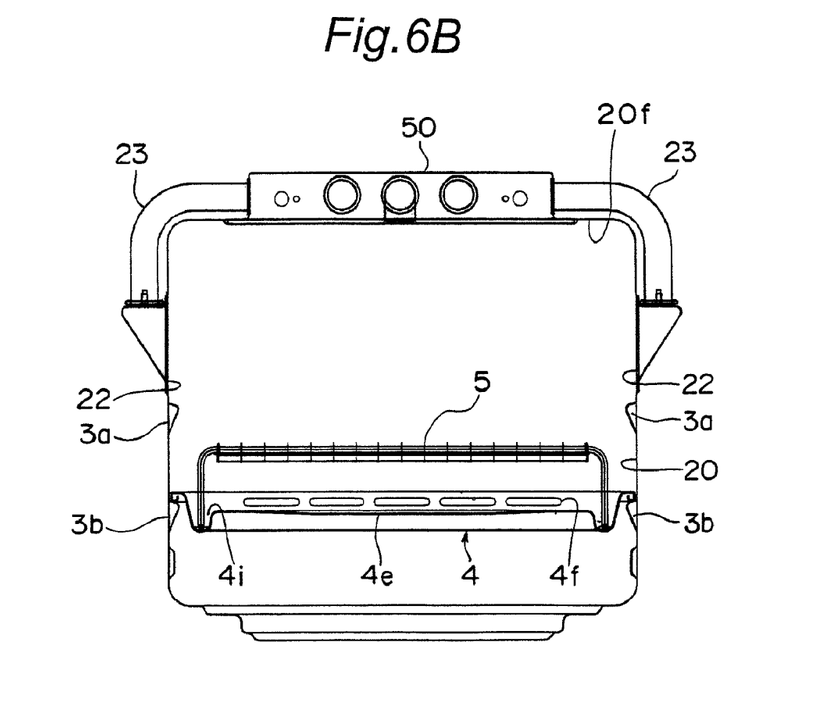
FIG. 6B is a view showing the tray engaged with the lower engagement portions of the heating chamber with the rear surface of the tray facing the ceiling side of the heating chamber.

FIGS. 6A and 6B are views showing the tray 4 engaged with the lower engagement portions 3a of the heating chamber 20. More specifically, FIG. 6A shows the tray 4 engaged in the heating chamber 20 with the front surface side facing the ceiling 20f side of the heating chamber 20, and FIG. 6B shows the tray 4 engaged in the heating chamber 20 with the rear surface side facing the ceiling 20f side of the heating chamber 20. Thus, a large-sized object to be cooked can be laid on the tray 4 or the grill netting 5 by engaging the tray 4 with the lower engagement portions 3a of the heating chamber 20.

Figure 7:
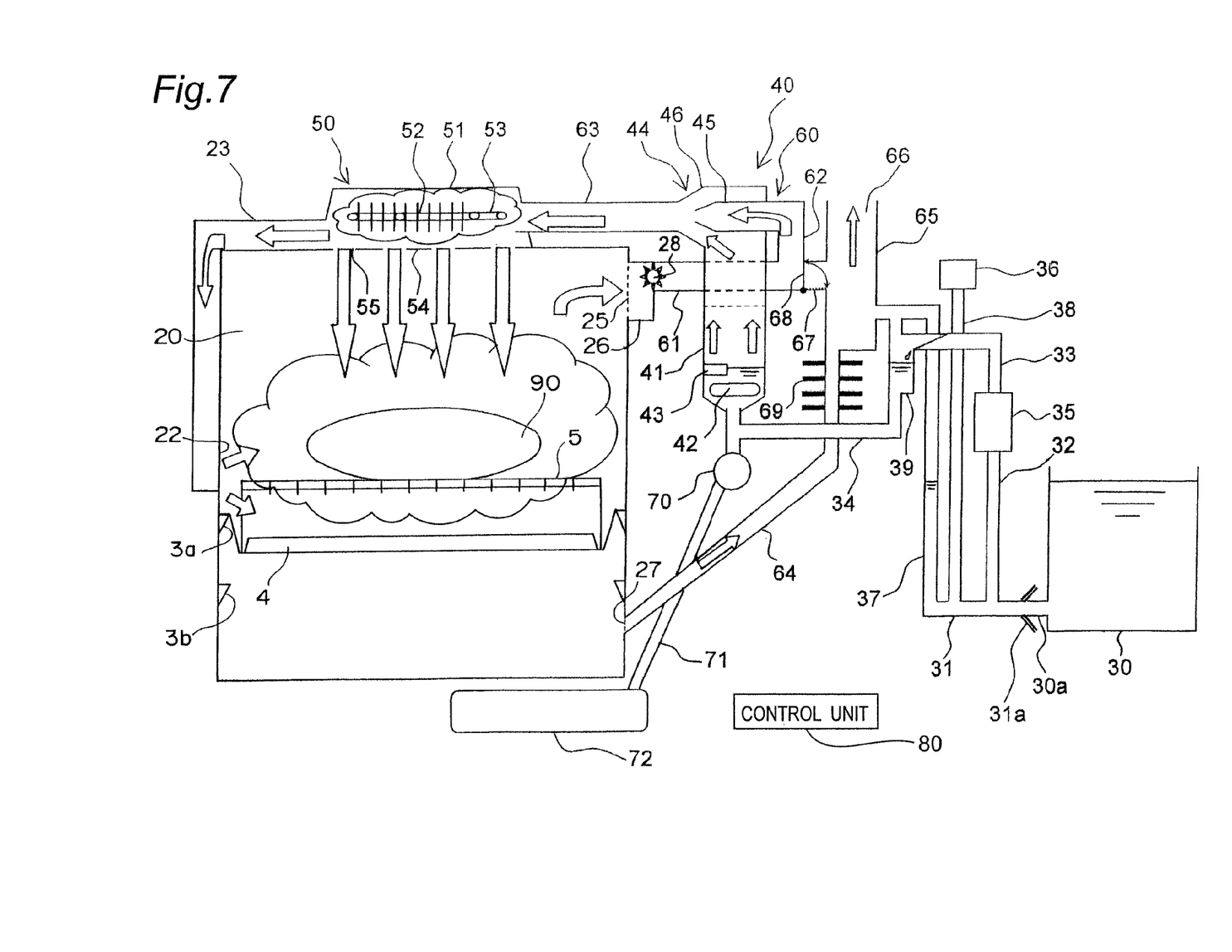
FIG. 7 is a schematic structure view showing the basic structure of a heating cooker in which steam cooking is performed using grill netting.

FIG. 7 is a schematic structure view showing the basic structure of the heating cooker 1. As shown in FIG. 7, the present heating cooker 1 includes a heating chamber 20, a water tank 30 for storing steam water, a steam generator 40 which evaporates the water supplied from the water tank 30 to generate steam, a temperature raising device 50 for heating the steam from the steam generator 40 and the fluid in the heating chamber 20, and a control unit 80 for controlling the operation of the steam generator 40, the temperature raising device 50 and the like.

FIG. 7 shows the case in which the tray 4 is placed in the heating chamber 20 with its rear surface side facing the ceiling side, and an object to be cooked 90 is placed on the grill netting 5 placed on the tray 4.

A joint portion 30a provided on the lower side of the water tank 30 is connectable to a funnel-shaped receiving port 31a provided in one end of a first water supply pipe 31. A suction side of a pump 35 is connected to an end portion of a second water supply pipe 32 which branches from the first water supply pipe 31 and extends upward, while a discharge side of the pump 35 is connected to one end of a third water supply pipe 33. Further, a water tank water level sensor 36 is provided in the upper end of a water level sensor pipe 38 which branches from the first water supply pipe 31 and extends upward. Further, a later-described exhaust gas duct 65 is connected to the upper end of an air release pipe 37 which branches from the first water supply pipe 31 and extends upward.

The third water supply pipe 33 has an L shape which curves generally in a horizontal position from a portion vertically placed, and an auxiliary tank 39 is connected to the other end of the third water supply pipe 33. Further, one end of a fourth water supply pipe 34 is connected to the lower end of the auxiliary tank 39, while a lower end of the steam generator 40 is connected to the other end of the fourth water supply pipe 34. One end of a drain valve 70 is connected to a portion below a junction point of the fourth water supply pipe 34a in the steam generator 40. And one end of a drain pipe 71 is connected to the other end of the drain valve 70, while a drain tank 72 is connected to the other end of the drain pipe 71. It is to be noted that the upper part of the auxiliary tank 39 is communicated with the atmosphere via an air release pipe 37 and the exhaust gas duct 65.

When the water tank 30 is connected to the receiving port 31a of the first water supply pipe 31, water in the water tank 30 goes up in the air release pipe 37 until it gains the same water level as that in the water tank 30. In this case, although the water level of the water level sensor pipe 38, which is connected to the water tank water level sensor 36, does not go up as its top end is sealed, the pressure of a sealed space in the water level sensor pipe 38 rises from atmospheric pressure in response to the water level of the water tank 30. This pressure change is detected by a pressure sensing element (not shown) in the water tank water level sensor 36, by which the water level in the water tank 30 is detected. Although the air release pipe 37 is unnecessary in the water level measurement when the pump 35 is at a standstill, the air release pipe 37 having an open end is provided in order to prevent the detection accuracy of the water level in the water tank 30 from deteriorating due to the suction pressure of the pump 35 directing acting upon the pressure sensing element.

The steam generator 40 includes a pot 41, the lower part of which is connected to the other end of the fourth water supply pipe 34, a steam generation heater 42 placed in the vicinity of the bottom face in the pot 41, a water level sensor 43 placed in the vicinity of the upper part of the steam generation heater 42 in the pot 41, and a steam suction ejector 44 attached to the upper part of the pot 41. A fan casing 26 is placed in the outside of an intake opening 25 provided in the upper side surface of the heating chamber 20. The fluid in the heating chamber 20 is sucked from the intake opening 25 with a blower fan 28 placed in the fan casing 26 and is sent into an inlet side of the steam suction ejector 44 of the steam generator 40 via a first pipe 61 and a second pipe 62. One end of the first pipe 61 is connected to the fan casing 26. One end of the second pipe 62 is connected to the other end of the first pipe 61, while the other end of the second pipe 62 is connected to an inlet side of an inner nozzle 45 of the steam suction ejector 44.

The steam suction ejector 44 has an outer nozzle 46 which covers the outside of the inner nozzle 45, and a discharge side of the inner nozzle 45 is communicated with the interior space of the pot 41. One end of a third pipe 63 is connected to a discharge side of the outer nozzle 46 of the steam suction ejector 44, while the other end of the third pipe 63 is connected to a temperature raising device 50.

The casing 26, the first pipe 61, the second pipe 62, the steam suction ejector 44, the third pipe 63, and the temperature raising device 50 constitutes an external circulation passage 60. Moreover, one end of a discharge passage 64 is connected to a discharge opening 27 provided on the lower side wall of the heating chamber 20, while the other end of the discharge passage 64 is connected to one end of an exhaust gas duct 65. Further, an exhaust port 66 is provided in the other end of the exhaust gas duct 65. A radiator 69 is externally fitted on the exhaust gas duct 65 side of the discharge passage 64. The exhaust gas duct 65 is connected via an exhaust gas passage 67 to a joint of the first pipe 61 and the second pipe 62, which form the external circulation passage 60. Further, a damper 68 which opens and closes the exhaust gas passage 67 is placed on the joint side of the first and second pipes 61 and 62 in the exhaust gas passage 67.

Moreover, the temperature raising device 50 includes a dish-shaped casing 51 placed at a roughly central portion on the ceiling side of the heating chamber 20 with its opening facing down, a first superheater 52 placed in the dish-shaped casing 51, and a second superheater 53 placed in the dish-shaped casing 51. The bottom face of the dish-shaped casing 51 is formed with a metal ceiling panel 54 provided on the ceiling 20f of the heating chamber 20. A plurality of ceiling outlets 55 are formed on the ceiling panel 54. In this regard, both the upper and lower surfaces of the ceiling panel 54 have topcoat of dark color through coating and other processing. It is to be noted that the ceiling panel 54 may be formed from metal materials which are changed into darker color by repeated use or dark-colored ceramic molded products.

Further, as for the temperature raising device 50, as shown in FIGS. 4A and 4B, respective one ends of a supply passage 23 extending toward both left and right sides (only one side can be seen in FIG. 7) are each connected to the upper part of the heating chamber 20. The supply passage 23 extends downward along both the left and right side walls of the heating chamber 20, and the other end thereof is connected to the outlets 22 provided at a roughly central portion in the vertical direction of both the left and right side walls of the heating chamber 20.

Description is now given of the control system of the present heating cooker 1.

Figure 8:
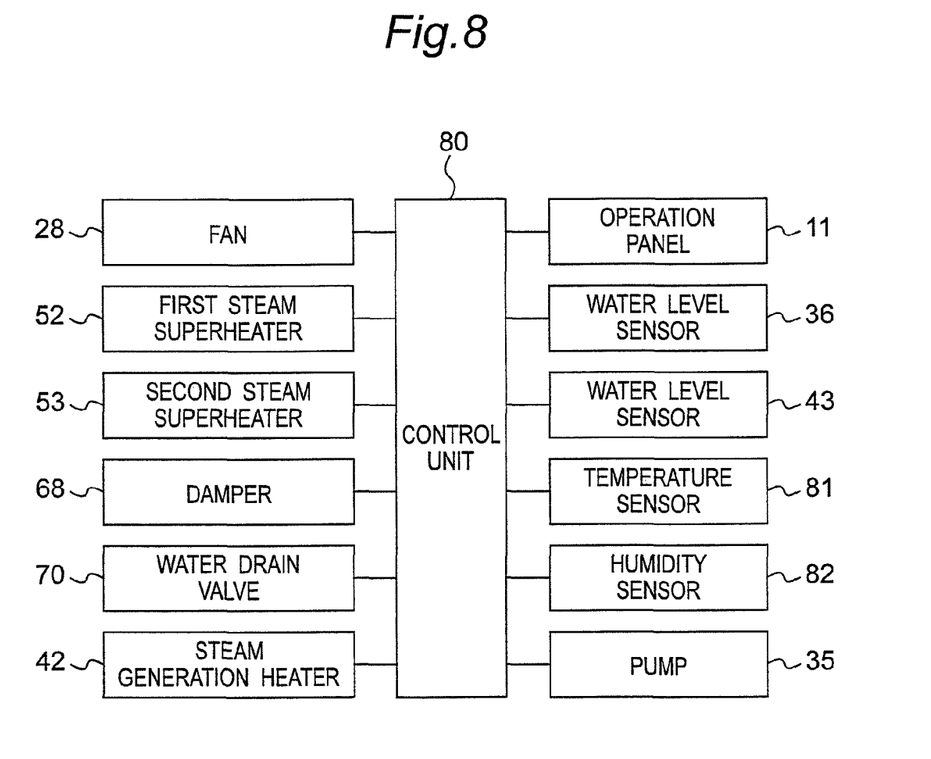
FIG. 8 is a schematic view showing a control system of the heating cooker.

A control unit 80, which is composed of a microcomputer and an input/output circuit, is connected to, as shown in FIG. 8, a blower fan 28, a first superheater 52, a second superheater 53, a damper 68, a drain valve 70, a steam generation heater 42, an operation panel 11, a water tank water level sensor 36, a water level sensor 43, a temperature sensor 81 for detecting the temperature in the heating chamber 20, a moisture sensor 82 for detecting the humidity in the heating chamber 20 and a pump 35. Based on detection signals from the water tank water level sensor 36, the water level sensor 43, the temperature sensor 81 and the moisture sensor 82, the control unit 80 controls the blower fan 28, the first superheater 52, the second superheater 53, the damper 68, the drain valve 70, the steam generation heater 42, the operation panel 11 and the pump 35 in conformity to a predetermined program.

Description is herein below given of the operation of the heating cooker 1 having the above structure. Upon pressing of an electric power switch (not shown) on the operation panel 11, a power supply is turned on and operation of heating cooking is started according to the content of an input into the operation panel 11 by an operator. Depending on the content of the input into the operation panel 11, steam cooking using superheated steam as heating fluid and hot-air cooking using high temperature air as heating fluid are performed.

Description is first given of the steam cooking. In the steam cooking, typically as shown in FIGS. 4B and 7, the tray 4 is engaged with the upper engagement portion 3a with its rear surface side facing the ceiling side of the heating chamber 20, while the grill netting 5 is placed on the tray 4, and an object to be cooked 90 is placed on the grill netting 5. Once the content of steam cooking is inputted into the operation panel 11, the control unit 80 closes the drain valve 70, and starts operation of the pump 35 in the state where the exhaust gas passage 67 is closed with the damper 68. Water is then supplied with the pump from the water tank 30 to the pot 41 of the steam generator 40 via the first to the fourth water supply pipes 31 to 34. Then, when the water level sensor 43 detects that the water level in the pot 41 reaches a predetermined water level, the pump 35 is stopped to stop water supply.

Next, the steam generation heater 42 is turned on, so that a specified amount of water accumulated in the pot 41 is heated by the steam generation heater 42.

Then, in concurrence with the turn-on of the steam generation heater 42, or once the temperature of the water in the pot 41 reaches a prescribed temperature, the blower fan 28 is turned on, and the first and second superheaters 52 and 53 of the temperature raising device 50 are turned on. As a consequence, the blower fan 28 sucks air (including steam) in the heating chamber 20 from the intake opening 25, and sends the air (including steam) to the external circulation passage 60. In that case, since a centrifugal fan is used for the blower fan 28, high pressure can be generated compared with the case where a propeller fan is used. Further, the flow velocity of circulating air current can greatly be increased by rotating the centrifugal fan used for the blower fan 28 at high speed with a direct-current motor.

Next, once the water in the pot 41 of the steam generator 40 boils, saturated vapor is generated, and the generated saturated vapor joins the circulating air current traveling along the external circulation passage 60 at a section of the steam suction ejector 44. The steam coming from the steam suction ejector 44 flows into the temperature raising device 50 via the third pipe 63 at high speed.

The steam which flowed into the temperature raising device 50 is then heated by the first and second superheaters 52 and 53, and turns into superheated steam of approximately 300° C. (it varies with the contents of cooking). Thus, the steam generator 40 and the temperature raising device 50 constitute a heating fluid generating section of the present invention. A part of the superheated steam generated in the temperature raising device 50 is ejected from a plurality of ceiling outlets 55 provided on the lower ceiling panel 54 toward the lower part in the heating chamber 20. The other part of the superheated steam is ejected from the outlet 22 on both the sides of the heating chamber 20 via the supply passage 23 provided on both left and right sides of the temperature raising device 50. The superheated steam from the outlet 22 on both the side walls of the heating chamber 20 flows into both the upper and lower sides of the object to be cooked 90 on the grill netting 5. In this way, the superheated steam which is ejected from the ceiling side of the heating chamber 20 is supplied toward the object to be cooked 90 in the center, while at the same time, the superheated steam is supplied toward the object to be cooked 90 from the left and right side walls of the heating chamber 20. As a result, on the upper side of the tray 4 in the heating chamber 20, a flow of the steam is generated which goes down in the central portion and goes up on the outside of the central portion. The steam on the upper side of the tray 4 is sequentially sucked to the intake opening 25, and returns into the heating chamber 20 again through the external circulation passage 60, thus establishing the circulation which is repeated.

Thus, by forming the flow of superheated steam in the heating chamber 20, temperature and humidity distribution can be maintained uniform on both the upper and lower sides of the object to be cooked 90 in the heating chamber 20, thereby making it possible to evenly heat both the upper and lower sides of the object to be cooked 90.

In the steam cooking performed as mentioned above, with heating, meat juices may ooze from an object to be cooked 90 which is meat for example, or water drops may be generated by condensation of superheated steam on the surface of the object to be cooked 90. Since these meat juices and water drops are dropped onto the tray 4 from the grill netting 5 and collected in the groove portion 4i of the tray 4, they can easily be disposed of after the end of cooking. Since the through holes 4f of the tray are formed on the edge portion 4a side of the side wall portion 4b of the tray, it becomes possible to prevent the meat juices and the like which have been collected in the groove portion 4i from leaking out of the tray 4 through the through holes 4f.

The hot-air cooking using high-temperature air is performed as follows. In the hot-air cooking which is different from the case in FIG. 7, the tray 4 is typically engaged with the upper engagement portion 3a with the front surface side facing the ceiling side of the heating chamber 20 as shown in FIG. 4A. An object to be cooked such as cookies and pizza is placed on the front surface side of the bottom portion 4e of the tray. When the content of the hot-air cooking is inputted into the operation panel 11, the control unit 80 turns on the blower fan 28, and the first and second superheaters 52 and 53 of the temperature raising device 50 are turned on. As a consequence, the blower fan 28 sucks air in the heating chamber 20 from the intake opening 25, and sends the air to the external circulation passage 60.

The air sent out to the external circulation passage 60 flows from the inner nozzle 45 of the steam suction ejector 44 into the third pipe 63 via the first pipe 61 and the second pipe 62. Since generation of steam by the pot 41 is not performed in the hot-air cooking, steam does not flow from the pot 41 side in the steam suction ejector 44. The air which flowed into the third pipe 63 flows into the temperature raising device 50, where the air is heated by the first and second superheaters 52 and 53 and turns into high temperature air of approximately 300° C. (it varies with the contents of cooking). As described above, of the steam generator 40 and the temperature raising device 50 that constitute the heating fluid generating section, the steam generator 40 is stopped, so that high temperature air as heating fluid is generated by operation of the temperature raising device 50. A part of the high temperature air is ejected from a plurality of the ceiling outlets 55 provided on the lower ceiling panel 54 toward the lower part in the heating chamber 20. The other part of the high temperature air is ejected from the outlet 22 on both the sides of the heating chamber 20 via the supply passage 23 provided on both left and right sides of the temperature raising device 50.

A part of the high temperature air, which has been ejected from the left and right side walls of the heating chamber 20, as shown with an arrow of FIG. 5, flows to the lower side of the tray 4 through the through holes 4f as the first through holes that are opposed to the steam outlet 22 of the tray 4, while the other part of the high temperature air flows to the upper side of the tray 4. In this way, the high temperature air which has been ejected from the outlets 22 of the both side walls of the heating chamber 20 is supplied to the upper side and the lower side of the tray 4. Once a sufficient amount of air is supplied to the lower side of the tray, a flow is generated which goes from the lower side to the upper side of the tray 4 via the through holes 4f as the second through holes provided in the edge portion on the front side and the back side of the tray 4 as seen from the opening 20a side of the heating chamber.

Thus, on the upper side of the tray 4 in the heating chamber 20, a flow of air is generated which goes down in the central portion and goes up on the outside of the central portion. Further on the lower side of the tray 4 in the heating chamber 20, a flow of air which goes to the back and forth direction from the left and right sides. Then, the air on the upper side of the tray 4 is sequentially sucked through the intake opening 25, and returns into the heating chamber 20 again through the external circulation passage 60, thus establishing the circulation which is repeated.

Thus, by forming the flow of high temperature air on both the upper side and lower side of the tray 4 in the heating chamber 20, the temperature distribution in the heating chamber 20 can be maintained uniform, thereby making it possible to heat the object to be cooked 90 on the tray 4 from both the upper and lower sides. As a result, both the upper and lower sides of the object to be cooked 90 can evenly be heated.

Moreover, by returning the high temperature air on the lower side of the tray 4 to the upper side of the tray 4 via the through holes 4f on the opening 20a side and the back side wall 20b side of the heating chamber, new high temperature air can efficiently be supplied to the lower side of the tray 4. Therefore, it becomes possible to efficiently heat the object to be cooked 90 also from the lower side of the tray 4.

During operation for the steam cooking or the hot-air cooking as mentioned above, as time passes, the amount of steam or air in the heating chamber 20 increases, and surplus steam or air travels through the discharge opening 27, the discharge passage 64 and the exhaust gas duct 65 and is discharged from the exhaust port 66. During this process, the steam which passes through the discharge passage 64 is cooled to form condensation with the radiator 69 provided in the discharge passage 64, or the high temperature air which passes through the discharge passage 64 is cooled in order to prevent direct discharge of the steam or the high temperature air to the outside as it is.

When the steam cooking or the hot-air cooking is completed after lapse of a predetermined cooking time, a message indicating termination of cooking is displayed on the operation panel 11 by the control unit 80, and also a signal is sounded with a buzzer (not shown) provided on the operation panel 11. When the user, who has been notified of the termination of cooking by these message and buzzer, opens the door 12, the control unit 80 detects the opening of the door 12 with a sensor (not shown), and instantaneously opens the damper 68 of the exhaust gas passage 67. Consequently, the first pipe 61 of the external circulation passage 60 is communicated with the exhaust gas duct 65 via the exhaust gas passage 67, and so the steam or air in the heating chamber 20 is discharged from the exhaust port 66 with the blower fan 28 via the intake opening 25, the first pipe 61, the exhaust gas passage 67, and the exhaust gas duct 65. This damper operation functions in the same manner when the user opens the door 12 during cooking. Therefore, the user can safely take out the object to be cooked 90 from the heating chamber 20 without being exposed to steam or high temperature air.

As mentioned above, according to the heating cooker of the present embodiment, reversible usage of the tray 4 corresponding to the steam cooking and the hot-air cooking makes it possible to place an object to be cooked in a position suitable for respective cooking modes. In the hot-air cooking in particular, both the upper and lower sides can evenly be heated even without the use of the grill netting 5. It is to be noted that the use of the grill netting 5 is not necessarily needed in the steam cooking. Moreover, the grill netting 5 may be used in the hot-air cooking. In short, the grill netting 5 can be an optional component for the heating cooker 1.

Moreover, although the tray 4 is engaged with the upper engagement portion 3a both in the steam cooking and the heating cooking in the above embodiment, the tray 4 may be engaged with the lower engagement portion 3b as shown in FIGS. 6A and 6B. In this case, a large-sized object to be cooked can be placed on the tray 4 or the grill netting 5, and the large-sized object to be cooked can be heated with the superheated steam or high temperature air.

In the above embodiment, although the upper engagement portion 3a is provided under the outlet 22, the upper engagement portion 3a may be provided above the outlet 22. In this case as well, using the tray 4 of the present embodiment makes it possible to supply a part of the steam from the outlet 22 to the lower side of the tray 4, and to supply the other part of the steam to the upper side of the tray 4 via the through hole 4f of the tray.

Steam may be supplied into the heating chamber 20 only by the outlets 22 on both the left and right side walls without the presence of the ceiling outlet 55. The outlet 22 may be provided only in one of the left and right side walls.

In the above embodiment, although two upper and lower pairs (3a, 3b) of the engaging portions are provided in order to place the tray 4 in the heating chamber 20, three or more pairs of the engaging portions may be provided instead. Alternatively, only one pair of the engaging portions 3 may be provided as in the heating cooker 101 shown in FIG. 9.

Figure 9:
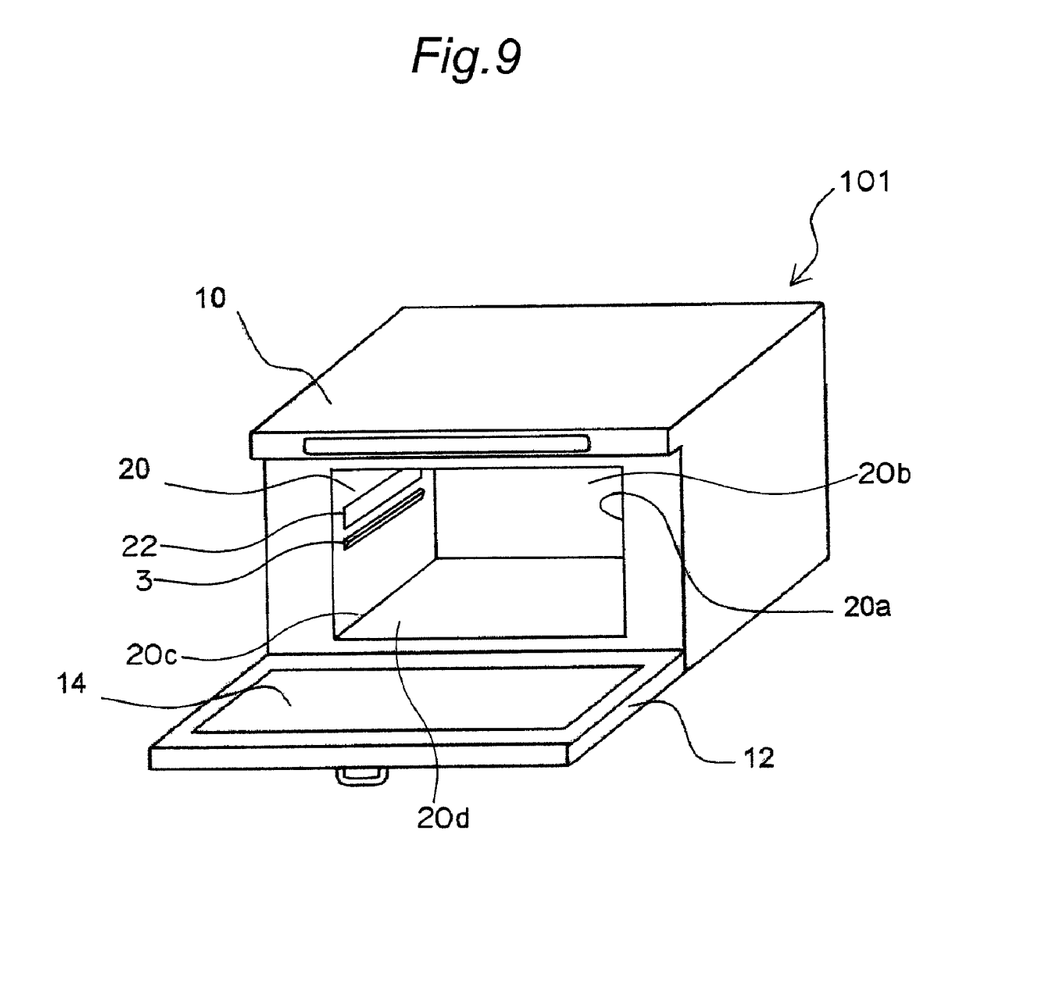
FIG. 9 is a perspective view showing an external appearance of a modified example of the heating cooker of FIG. 1.
Figure 10:
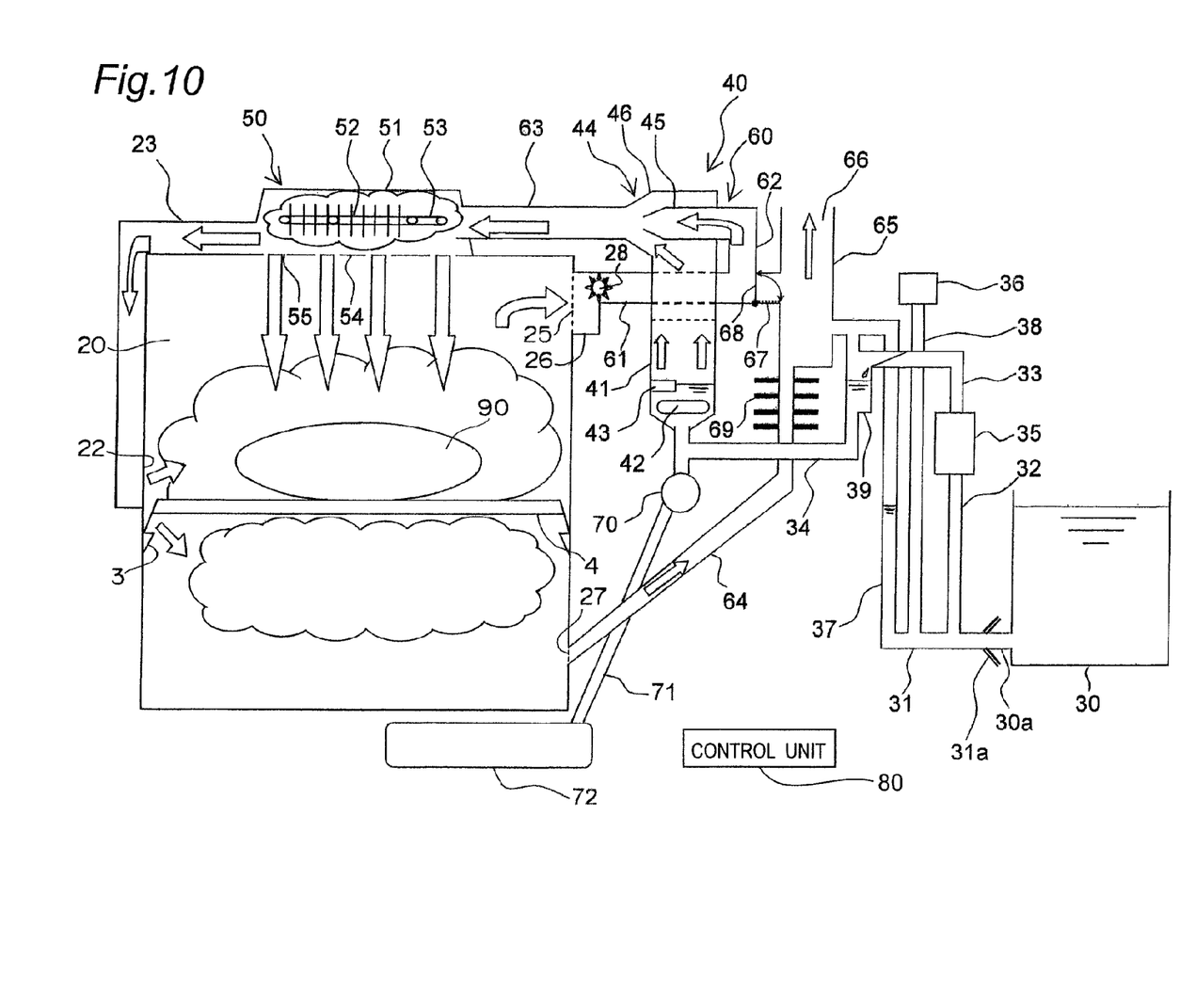
FIG. 10 is a view similar to FIG. 7, showing the heating cooker of FIG. 9 in which steam cooking is performed without using any grill netting.

FIG. 10 is a view similar to FIG. 7 in which a heating cooker 101 of FIG. 9 is used in place of the heating cooker 1 of FIG. 1 for conducting steam cooking without using the grill netting 5. In this case, as in the hot-air cooking without the use of the grill netting 5 mentioned above, the tray 4 is engaged with the engaging portions 3 with its front surface side facing the ceiling 20f side of the heating chamber 20. An object to be cooked 90 is placed on the bottom portion 4e of the tray 4 placed in the heating chamber 20.

The basic operation of the heating cooker 101 during steam cooking is similar to the operation in the steam cooking performed by the heating cooker 1 in relation to FIG. 7, in which superheated steam is ejected from a plurality of the ceiling steam outlets 55 provided on the ceiling panel 54 to the lower part of the heating chamber 20, while being ejected from the steam outlets 22 on both the side walls of the heating chamber 20 via the steam supply passages 23 provided on both the left and right sides of the steam temperature raising device 50.

However, the tray 4 is placed with the front surface side facing the ceiling side of the heating chamber 20 in the example shown in FIG. 10, and therefore as with the above-mentioned flow of the hot air in the hot-air cooking with the heating cooker 1, a part of the superheated steam which has been ejected from the left and right side walls of the heating chamber 20 flows to the lower side of the tray 4 via the through holes 4f as the first through holes which are opposed to the steam outlet 22 of the tray 4, while the other part of the superheated steam flows to the upper side of the tray 4 as shown by an arrow in FIG. 5. In this way, the superheated steam which has been ejected from the outlets 22 on both the side walls of the heating chamber 20 is supplied to the upper side and the lower side of the tray 4. Once a sufficient amount of steam is supplied to the lower side of the tray, a flow is generated which goes from the lower side to the upper side of the tray 4 via the through holes 4f as the second through holes provided in the edge portions on the front side and the back side of the tray 4 as seen from the opening 20a side of the heating chamber.

Thus, on the upper side of the tray 4 in the heating chamber 20, a flow of steam is generated which goes down in the central portion and goes up on the outside of the central portion. Further on the lower side of the tray 4 in the heating chamber 20, a flow of steam which goes to the back and forth direction from the left and right sides. The steam on the upper side of the tray 4 is sequentially sucked through the intake opening 25, and returns into the heating chamber 20 again through the external circulation passage 60, thus establishing the circulation which is repeated.

Thus, by forming a flow of superheated steam on both the upper side and lower side of the tray 4 in the heating chamber 20, the temperature and humidity distribution in the heating chamber 20 can be maintained uniform, thereby making it possible to heat the object to be cooked 90 on the tray 4 from both the upper and lower sides. As a result, both the upper and lower sides of the object to be cooked 90 can evenly be heated.

Moreover, by returning the superheated steam on the lower side of the tray 4 to the upper side of the tray 4 via the through holes 4f on the opening 20a side and the back side wall 20b side of the heating chamber, new superheated steam can efficiently be supplied to the lower side of the tray 4. Therefore, it becomes possible to efficiently heat the object to be cooked 90 also from the lower side of the tray 4.

Thus, with the simple structure in which the tray 4 is engaged with the engaging portions 3 on both the left and right side walls of the heating chamber 20 with the through holes 4f of the tray facing to the outlet 22, the heating cooker 101 can evenly heat the object to be cooked without using conventional tall grill netting. Therefore, it becomes possible to save the time and effort to place the grill netting in the heating chamber before cooking, and also maintenance can be facilitated since only the tray 4 should be cleaned after cooking.

Although the tray 4 is engaged with the engaging portions 3 and heating is performed from both the upper and lower sides of the tray 4 in the example shown in FIG. 10, the tray 4 should be placed on the bottom face 20d of the heating chamber 20, when heating is to be conducted only from the upper side of the tray 4. In this case, it is not necessary to secure the place for placing the non-use grill netting as in the conventional case, and also the non-use grill netting does not becomes obstructive, nor give an untidy impression.

Although the heating cooker 101 has the engaging portion 3 provided on the lower side of the outlet 22 similar to the upper engagement portions 3a of the heating cooker 1, the engaging portion 3 may be provided on the upper side of the outlet 22. In this case, if there is space to spare in the upper side of the heating chamber 20, the tray 4 is engaged with the engaging portions 3 with the front surface side facing the ceiling 20f side, or the tray 4 is engaged with the engaging portions 3 with the front surface and the rear surface reversed, so that the through holes 4f of the tray 4 are made to be opposed to the steam outlet 22, by which a part of the steam from the steam outlet 22 can be supplied to the upper side of the tray 4 via the through holes 4f of the tray, while the other part of the steam can be supplied to the lower side of the tray 4.

In the above embodiment, although the through holes 4f are provided along all of the four sides of the tray 4, through holes 4f to be positioned either on the opening 20a side or on the back side wall 20b side of the heating chamber when placed in the heating chamber 20 may be eliminated. Moreover, the number of the through holes 4f formed near each side is not restricted to four but may be any number. Moreover, the shape of the through hole 4f is not restricted to a rectangular shape, but may take any shape such as square, circular and ellipse shapes.

Moreover, although superheated steam or high temperature air of about 300° C. at one atmospheric pressure is used as the heating fluid in the above embodiment, steam of about 100° C. at one atmospheric pressure can also be used. In short, other forms of heating fluid such as gas and liquid can also be used as long as an object to be cooked can be heated.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A heating cooker, comprising:
   a heating fluid generating section for generating a heating fluid;
   a heating chamber for heating an object to be cooked with the heating fluid supplied from the heating fluid generating section, said heating chamber having a ceiling and two side walls opposite to each other;
   an outlet provided on at least one of the two side walls of the heating chamber for ejecting the heating fluid supplied from the heating fluid generating section into the heating chamber;
   engaging portions provided on each of the side walls of the heating chamber; and
   a tray engageable with the engaging portions and comprising a bottom portion having a front surface and a rear surface so that an object to be cooked is placed on either one of the front surface and the rear surface, a groove portion formed along an edge of the bottom portion, a side wall portion continuous from the groove portion, and a through hole formed in the side wall portion, wherein
   said tray is configured such that:
   when the tray is engaged with the engaging portions with the front surface of the bottom portion facing the ceiling side of the heating chamber, the through hole of the side wall portion is opposed to the outlet so that a part of heating fluid from the outlet is passed to either one of the front surface side or the rear surface side of the bottom portion, whereas
   when the tray is engaged with the engaging portions with the rear surface of the bottom portion facing the ceiling side of the heating chamber, an opening of the groove portion faces the ceiling side of the heating chamber.

2. The heating cooker according to claim 1, wherein
   the heating fluid generating section has a steam mode for generating superheated steam as the heating fluid and a hot air mode for generating a high temperature air as the heating fluid.

3. The heating cooker according to claim 1, which is configured such that when the tray is engaged with the engaging portions with the rear surface of the bottom portion facing the ceiling side of the heating chamber, the through hole of the tray is located closer to the ceiling side than the rear surface of the bottom portion in a thickness direction of the bottom portion of the tray.

4. A heating cooker, comprising:
   a heating chamber;
   outlets provided in respective ones of right-hand and left-hand side walls of the heating chamber through which heating fluid is ejected into the heating chamber; and
   a tray for supporting an object to be cooked with the heating fluid, wherein
   the heating fluid is superheated steam,
   each of the outlets in the right-hand and left-hand side walls extends in an anteroposterior direction of these side walls such that the superheated steam is ejected from only a partial area of each of the side walls,
   the tray comprises a bottom portion on which an object to be cooked is placed, and a side wall portion provided around the bottom portion, the side wall portion having a function of splitting a flow of the superheated steam into flows going upward and downward of the bottom portion,
   the heating chamber has engaging portions with which the tray is engageable, the engaging portions being arranged such that the side wall portion of the tray, when engaged with the engaging portions, is located in vicinity of the outlets of the side walls of the heating chamber and opposed to the outlets,
   the side wall portion of the tray has first through holes to face the outlets of the side walls of the heating chamber to allow a part of the superheated steam to flow downward of the bottom portion of the tray,
   the tray further comprises a second through hole in at least one of a front area and a rear area of the side wall portion, the front and rear areas being continuous to areas of the side wall portion opposite to the outlets of the right-hand and left-hand side walls of the heating chamber, the second through hole allowing the superheated steam once flowed downward of the bottom portion of the tray to flow upward of the bottom portion.

5. The heating cooker according to claim 4, further comprising:
   a superheated steam generating section for generating the superheated steam, wherein each of the outlets in the right-hand and left-hand side walls of the heating chamber has a slant surface for guiding a flow of the superheated steam, supplied from the superheated steam generating section, slantly downward to the corresponding side wall, and the side wall portion of the tray splays out from an upper side toward a lower side of the tray.

6. A heating cooker, comprising:

a heating fluid generating section for generating a heating fluid;

a heating chamber for heating an object to be cooked with the heating fluid supplied from the heating fluid generating section;

an outlet for ejecting the heating fluid supplied from the heating fluid generating section into the heating chamber;

engaging portions provided on side walls of the heating chamber; and a tray engageable with the engaging portions of the heating chamber, the tray comprising a bottom portion to receive the object to be cooked, a side wall portion provided around the bottom portion, and a through hole formed in the side wall portion, wherein when the tray is engaged with the engaging portions of the heating chamber, a part of the heating fluid ejected from the outlet into the heating chamber flows above the tray, while another part of the ejected heating fluid flows downward of the tray through the through hole, wherein the tray is configured such that:

when the tray is engaged with the engaging portions with a front surface of the bottom portion facing a ceiling side of the heating chamber, the through hole of the side wall portion is opposed to the outlet so that a part of the heating fluid supplied from the heating fluid generating section is ejected from the outlet toward the through hole, whereas when the tray is engaged with the engaging portions with a rear surface of the bottom portion facing the ceiling side of the heating chamber, the through hole of the side wall portion is not opposed to the outlet and a quantity of the heating fluid flowing downward of the tray through the through hole is less and a quantity of the heating fluid flowing above the tray is more than when the tray is engaged with the engaging portions with the front surface of the bottom portion facing the ceiling side of the heating chamber, wherein the heating fluid generating section has a steam mode for generating superheated steam as the heating fluid and a hot air mode for generating a high temperature air as the heating fluid, in the steam mode, the tray is engaged with the engaging portions with the rear surface of the bottom portion facing the ceiling side of the heating chamber, and in the hot air mode, the tray is engaged with the engaging portions with the front surface of the bottom portion facing the ceiling side of the heating chamber.

7. The heating cooker according to claim 6, wherein the outlet has a slant surface for guiding a flow of the heating fluid, supplied from the heating fluid generating section, slantly downward to the side wall of the heating chamber, and the side wall portion of the tray splays out from the rear surface side toward the front surface side of the tray.

8. The heating cooker according to claim 6, wherein the tray has a groove portion between the bottom portion and the side wall portion, the groove portion being open to the rear side of the tray.

9. The heating cooker according to claim 8, which is configured such that when the tray is engaged with the engaging portions with the rear surface of the bottom portion facing the ceiling side of the heating chamber, the through hole of the tray is located closer to the ceiling side of the heating chamber than the rear surface of the bottom portion in a thickness direction of the bottom portion of the tray.

* * * * *